Sept. 22, 1970  W. D. MUNDINGER  3,529,747
MATERIAL DISCHARGE ARRANGEMENT FOR HOPPER STRUCTURES
Filed Sept. 30, 1968  2 Sheets-Sheet 2
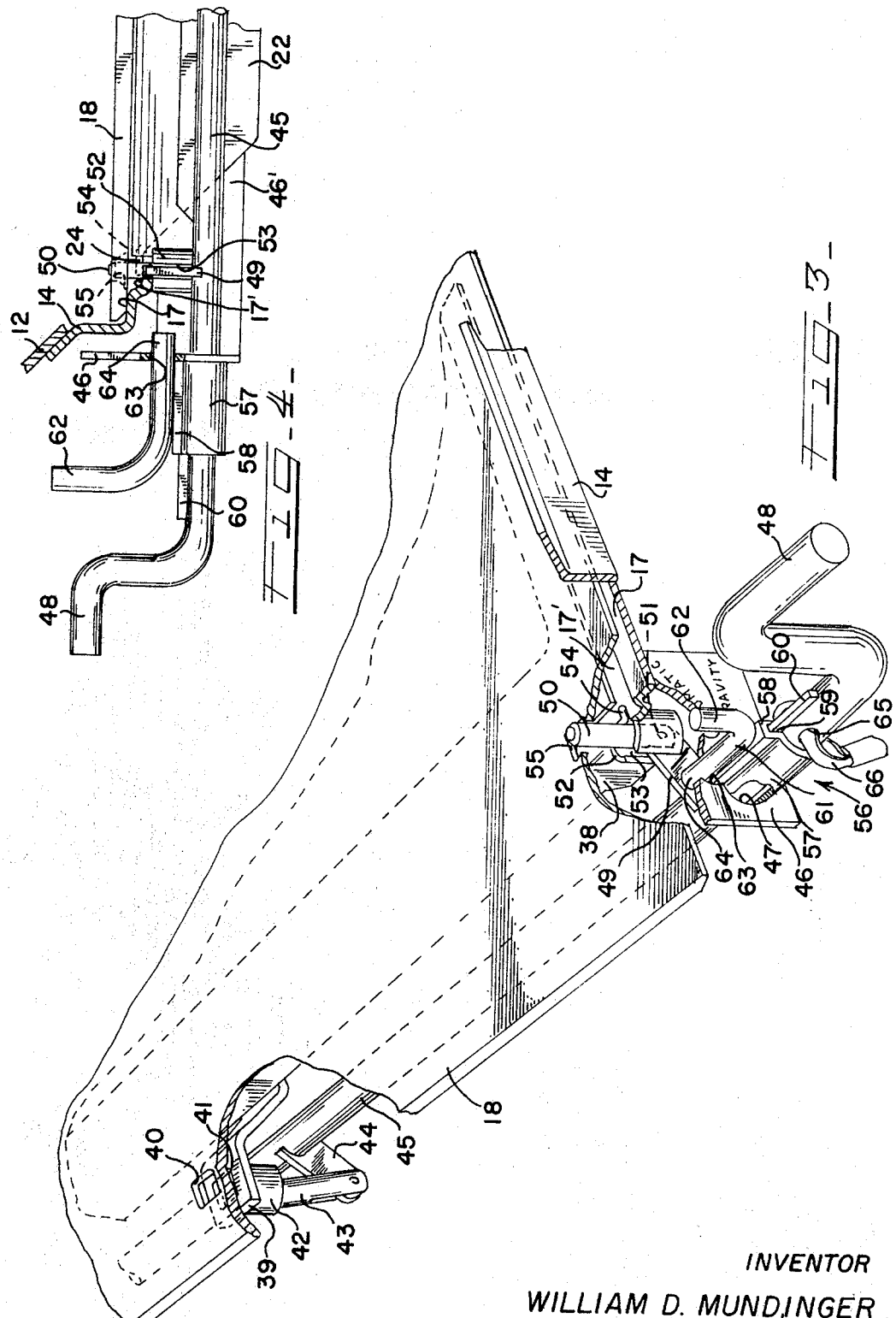
INVENTOR
WILLIAM D. MUNDINGER
BY Helmut O. Vogel
ATT'Y.

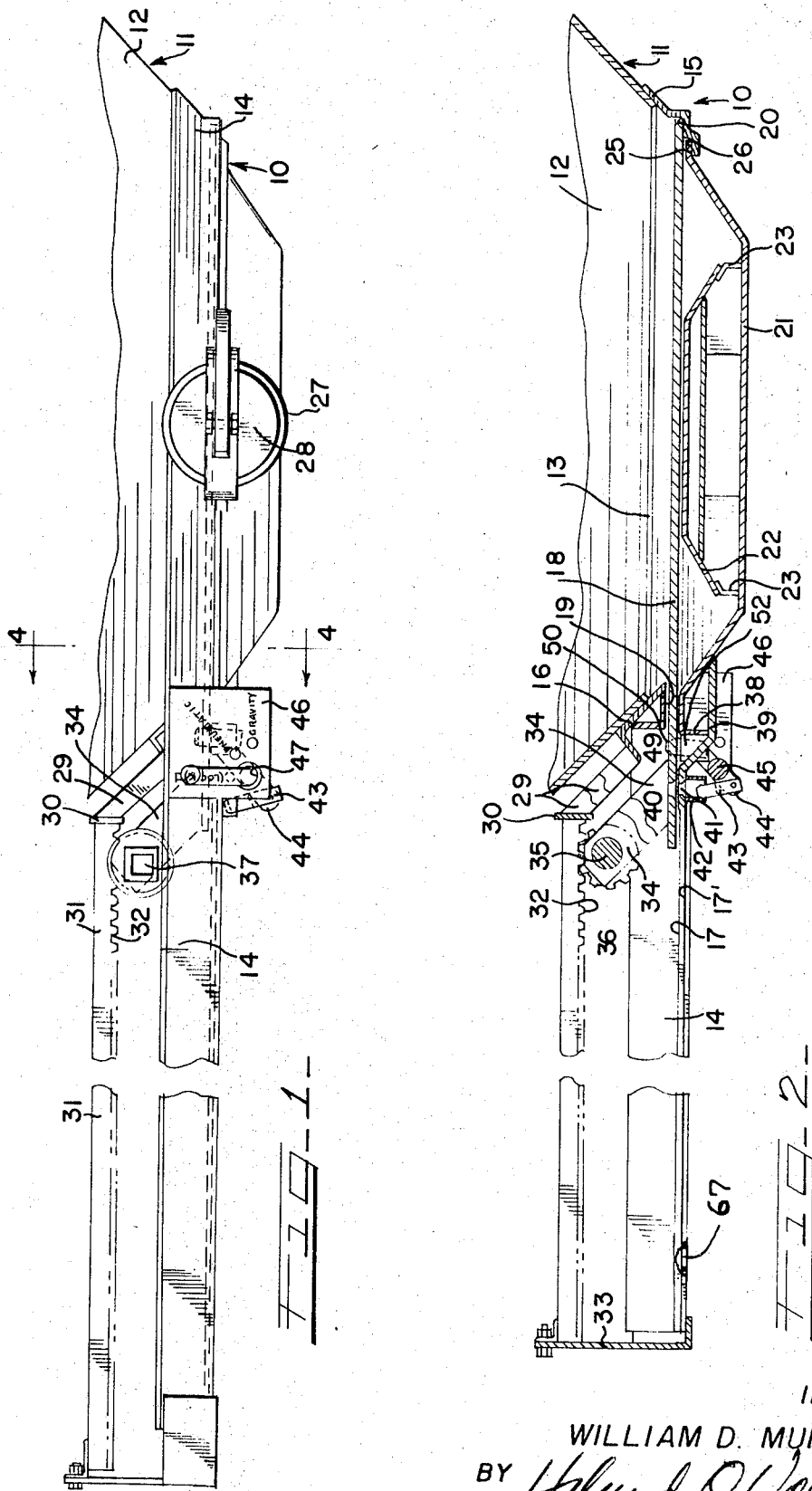

United States Patent Office

3,529,747
Patented Sept. 22, 1970

3,529,747
MATERIAL DISCHARGE ARRANGEMENT
FOR HOPPER STRUCTURES
William D. Mundinger, Highland, Ind., assignor to Pullman Incorporated, Chicago, Ill., a corporation of Delaware
Filed Sept. 30, 1968, Ser. No. 763,746
Int. Cl. B67d 5/12; B61d 3/00
U.S. Cl. 222—41                    6 Claims

ABSTRACT OF THE DISCLOSURE

A discharge arrangement for a hopper structure which includes a sliding gravity gate positionable underneath the hopper for for gravity discharge and a pneumatic discharge pan positioned underneath the gate and which upon opening of the gate permits pneumatic discharge. A manually selectable indexing arrangement includes a rotating shaft which upon rotation to a certain position interconnects the pneumatic gate with the gravity gate for movement therewith to open and closed positions. The indexing arrangement includes a locking arrangement which is connected to the shaft and which may be moved into a locking position whereby both the gate and the discharge pan are locked in the closed position.

BACKGROUND OF THE INVENTION

Field of the invention

The invention relates to the art of discharge mechanisms for vehicle hopper structures which have outlets at their lower ends for the discharge of materials. Such mechanisms are generally used in railway hopper cars and the structure utilized contains a sliding gate and a pneumatic discharge pan disposed underneath the gate with mechanism for interconnecting the gates for conjoint movement to open and closed positions and also for individual movement whereby the hopper may be emptied by gravity or by pneumatic unloading means.

Description of the prior art

The prior art includes structures wherein a gravity gate includes a mechanism which withdraws the gate to permit gravity discharge. A sanitary pan may be positioned beneath the gravity gate and upon withdrawal of the gravity gate the pan is also moved by the gate to an open position. Thus simultaneous movement of a gravity gate and a closure member beneath the discharge opening of a hopper structure are old in the art. This is further exemplified by structures as shown in the Campbell Pat. 1,342,091 wherein an upper and a lower gate include interconnecting linkage mechanisms which permit simultaneous opening of both closures to the open position. It is broadly old in the field of closure members to utilize the structure shown in the Kraemer Pat. 1,931,661 wherein a closure member is the form of a window may be selectively connected to a window guard for moving both to open and closed positions.

SUMMARY

The invention is concerned primarily with a hopper gate discharge structure wherein a gravity gate is moved by a manually operable indexing mechanism and a pneumatic discharge pan is disposed beneath the gravity gate and may be selectively indexed for movement therewith. The indexing mechanism also includes a shaft supporting a locking arrangement having a movable locking member which may be manipulated into locking engagement with a keeper which prevents rotation of the shaft and maintains the gate and the discharge pan in a locked relation relative to a frame disposed underneath the hopper.

BRIEF DESCRIPTION OF THE DRAWINGS

FIG. 1 is a side elevational view of a materials hopper having a bottom outlet and discharge arrangement;

FIG. 2 is a sectional view through the structure shown in FIG. 1;

FIG. 3 is a perspective view of a portion of a discharge arrangement for a hopper structure showing particularly an indexing means for interconnecting a gate and pan disposed underneath the hopper; and FIG. 4 is an enlarged cross-sectional view taken substantially along the line 4—4 of FIG. 1.

DESCRIPTION OF THE PREFERRED EMBODIMENT

A hopper discharge arrangement is generally designated by the reference character 10 and includes a hopper 11 formed by a plurality of sloping walls 12. The sloping walls 12 converge at their lower ends to provide a discharge opening 13 as best shown in FIG. 2. Connected to the opposite sides of sloping walls 12 are a pair of side frame members 14 interconnected by a front frame member 15. As best shown in FIG. 2, a pair of connected angle members extending transversely form a rear frame member designated at 16. The side frame members 14 extend from the hopper laterally outwardly with respect thereto and each includes a configuration to provide an upper track 17 and a lower track 17', as best shown in FIG. 4. A gravity gate 18 is seated upon the tracks 17 to slide relative thereto and moves from a position underneath the discharge opening 13, as best shown in FIG. 2, through an opening 19 provided below the rear frame member 16. In the closed position of the gate 18, as shown in FIG. 2, the gravity gate 18 has its end seated upon a ledge 20 provided on the front frame member 15.

A pneumatic discharge pan of dish-shaped construction is designated at 21 and includes a pneumatic hood 22 adapted to convey materials discharged to said pan 21 through openings 23. The front edge of the pan 21 is provided with a front flange 25 suitably seated upon a ledge 26 of the front frame member 15. A pneumatic outlet tube 27 of conventional construction is supported on opposite sides of the pan 21 projecting outwardly with respect thereto and communicates with the hood 22 to transport material to a suitable vacuum unloading arrangement (not shown). Each of the outlet tubes 27 are closed by means of conventional removable caps 28.

The rear frame member 16 has supported thereon a pair of upwardly extending brackets 29 to which a transverse beam 30 is connected. The beam 30 has suitably connected thereto a pair of racks 31 having rack teeth 32. The racks 31 are suitably supported on a transverse vertical bracket 33 which also suitably connects and supports the side frame members 14, as best shown in FIG. 2.

A pair of pinion support brackets 34 are rigidly secured to the gate 18, as best shown in FIG. 2, and the shaft 35 is mounted for rotation on said brackets 34 having secured thereto a pair of pinions 36 which engage the rack teeth 32. An operating head 37 is provided on each shaft 35 for engagement by a suitable tool (not shown) whereby upon manual rotation of the shaft 35 the racks 31 and pinions 36 provide for movement of the gate 18 from the position shown in FIG. 2 to an out-of-the-way open position as it slides along the upper track 17. The rear end of the pan 21 as shown in FIG. 2 is provided with a downwardly extending flange 38 to which a Z-shaped bracket 39 is connected. A central opening 40, as best shown in FIGS. 2 and 3, is provided on the gate 18 and is in registry with an opening 41 provided in the Z-shaped bracket 39. A sleeve 42 is supported on the bracket 39 underneath the opening 41. A dog 43 is pivotally connected to an arm 44 rigidly secured to the shaft 45 rotable on brackets 46 within openings 47. The brackets 46 are disposed on opposite sides of the pan 21 and are suitably connected thereto by means of transverse support members 46'.

The shaft 45 includes a manually operable handle 48. As best shown in FIGS. 2 and 4, an arm 49 is connected to one end of the shaft 45 and has pivotally connected thereto the dog 50 as indicated at 51. While in FIGS. 3 and 4 only one of the dogs 50 is shown, it is understood the other end of the shaft is provided with a similar structure. A sleeve 52 is connected at each side of the pan 21 to the downwardly extending flange section 38 and includes a vertical slot 53 through which the arm 49 moves during rotation of the shaft 45. As best shown in FIGS. 3 and 4, openings 54 are provided in the track section 17' through which the dog 50 projects and the dogs 50 engage openings 55 in the gate 18 whereupon the gate and the pan are in a locked position underneath the discharge opening 13.

A locking arrangement 56 is provided on each opposite end of the shaft 45. Each locking arrangement 56 comprises a slidable sleeve 57 having along its upper surface an inverted U-shaped projection 58 providing an elongated slot 59. The slot 59 receives a raised key 60 provided on the shaft 45 and permits sliding movement of the sleeve 57 which is fixed against relative rotation with respect to the shaft 45 by means of the key 60 and its engagement with the slot 59. A locking element is indicated at 61 and includes a handle 62, said locking element 61 being rigidly connected to the sleeve 57 for moving the same in sliding operation. A keeper opening 63 is provided in each bracket 46 and during the closed position, as best shown in FIGS. 3 and 4, an end 64 of the locking element 61 is retained within the keeper opening 63. As best shown in FIG. 3, a transverse bore 65 contains a car seal 66 which prevents outward sliding movement of the sleeve 57 so as to maintain the said locking element 61 in its locked position.

THE OPERATION

As best shown in FIG. 1, the brackets 46 have the designations "gravity," "pneumatic" and "lock," and the handle 48 may be moved into positions registering with these designations. When the handle 48 is in the lock position as shown in FIGS. 1 and 2, the dog 43 is out of engagement with the openings 40 and 41. However, the dog 50 is moved through the openings 54 and 55 so that the pan 21 is held against movement relative to the track 17' and the gate 18 is also held by the dog 50 against movement from underneath the discharge opening 13. In this position the hopper which may be provided on a hopper car, is ready for transporting movement with every assurance that neither the gravity 18 nor the pneumatic pan 21 can be accidentally moved to an open position. The shaft 45 is positively locked against rotation since the ends 64 of the locking elements 61 are fixed in place in the keeper openings 63 of the brackets 46. A car seal 66 inserted through the bore 65 does not permit the locking element 61 to move from its engaged position.

When the hopper car has reached its destination and it is desired to discharge by means of pneumatic unloading, the caps 28 are removed and the pneumatic outlet tube 27 is connected to a suitable vacuum unloading arrangement. The operator now breaks the car seal 66 and moves the locking element 61 out of engagement with the keeper opening 63 whereupon the shaft 45 may be rotated. The handle 48 is then moved to rotate the shaft 45 until it is in alignment with the designation "pneumatic." This movement causes the arm 49, shown in FIG. 2, to move in a clockwise direction, lowering the dog 50 out of its engagement with the opening 55 of the gate 18. The dog 50, however, still remains in engagement with the opening 54 of the track 17'. The operator may now turn the shaft 35 whereupon the gate 18 is moved on the tracks 17 to the left, shown in FIG. 2, to an open or out-of-the-way position. The pneumatic pan 21 however is retained underneath the discharge opening 13 since the dog 50 is still in engagement with the opening 54 of the track 17'.

In the event that it is desired to discharge by gravity, the gate 18 and the pan 21 may be moved conjointly from the position shown in FIG. 2 to the left to an out-of-the-way position. The shaft 45 is then rotated until the handle is in alignment with the designation "gravity" and the dog 43 is now moved through the sleeve 42 through the openings 41 into the opening 40 of the gate 18 whereupon simultaneously the dog 50 is moved below the opening 54 so that the pan 21 is now free to move with the gate 18 to its open position.

When the desired quantity of material has been discharged from the hopper, it is a simple matter to close both the gate 18 and the pan 21 and rotate the shaft 45 to the lock position whereupon insertion of a car seal 66 is easily effected after the locking element 61 has been moved to its engaged position relative to the keeper opening 63.

Thus, it is clearly apparent that the shaft 45, dogs 50 and related parts, provide a simple indexing mechanism whereupon by the rotation of a single shaft, the interconnection and disconnection between the pan 21 and the gate 18 is effected. The simple but effective locking mechanism 56 permits the operator to quickly and effectively provide for locking and unlocking action with complete assurance that during transit the gates are maintained in their closed position. This is particularly important in railroad operation since during operation of the trains, the gates have a tendency to become unlocked and an effective locking means is necessary so as to prevent accidental discharge of the load contained within the hopper car.

As best shown in FIG. 2, the tracks 17' are each provided, adjacent their ends, with openings 67 which act as stops and receive the dogs 50 when the pan 21 is moved to its position to the left of the discharge opening 13. The pan 21 in its open position may be cleaned with the gravity gate in the closed position. This is accomplished by first moving the pan 21 and gravity gate 18 conjointly to one side of the discharge opening 13 as above described. The gravity gate is then moved over the discharge opening. The pan 21 is now locked in the position at one side of the discharge opening by rotation of the shaft 45 and setting of the handle 48 in registry with the "pneumatic" designation whereupon the dogs 50 are engaged in the openings 67.

What is claimed is:

1. A bottom outlet structure adapted to be secured beneath a hopper structure having a discharge opening for the discharge of material, comprising:
  a frame disposed beneath said hopper structure including a pair of horizontally spaced track members supported on opposite sides of said discharge opening,
  a gate slidingly supported on said track members,
  means for moving said gate on said track members to open and closed positions relative to said discharge opening,
  a material discharge member including a pneumatic outlet supported on said track members movable to open and closed positions relative to said discharge opening,
  manually selectable indexing means between said gate and said material discharge members including
    a rod carried on said pan for movement therewith,
    a pair of vertical brackets on said pan positioned in horizontally spaced relation for rotatably supporting said rod, said rod including first dog means engageable with said gate during rotation of said rod whereby said gate and pan are conjointly movable to and from said positions, second dog means on said rod engageable with said frame during rotation of said rod whereby said pan is fixed in said closed position and said gate may be moved to its open position, said second dog means being movable during rotation of said rod into engagement with said frame and said gate to lock the same and said pan in said closed position, and lock means movable on said rod engageable with keeper means on one of said vertical brackets for locking said rod against rotation.

2. The invention in accordance with claim 1,
said lock means including a locking element connected to said rod for sliding movement longitudinally with respect to the axis of said rod, and
said keeper including an opening in one of said brackets engaged by said locking element during sliding movement thereof.

3. The invention in accordance with claim 2,
said locking means including a sleeve slidingly and non-rotatably mounted relative to said rod and said locking element being rigidly connected thereto.

4. The invention in accordance with claim 3,
including a stop element on said rod restraining sliding movement of said sleeve and locking element from disengagement with said keeper opening.

5. A bottom outlet structure adapted to be secured beneath a hopper structure having a discharge opening for the discharge of material, comprising:
a frame disposed beneath said hopper structure including a pair of horizontally spaced track members supported on opposite sides of said discharge opening,
a gate slidingly supported on said track members,
means for moving said gate on said track members to open and closed positions relative to said discharge opening,
a material discharge member including a pneumatic outlet supported on said track members movable to open and closed positions relative to said discharge opening,
manually selectable indexing means between said gate and said material discharge member, including
a rod carried on said pan for movement therewith,
a pair of vertical brackets on said pan positioned in horizontally spaced relation for rotatably supporting said rod,
said rod including first dog means engageable with said gate during rotation of said rod whereby said gate and pan are conjointly movable to and from said positions,
second dog means on said rod engageable with said frame during rotation of said rod whereby said pan is fixed in said closed position and said gate may be moved to its open position,
said second dog means being movable during rotation of said rod into engagement with said frame and said gate to lock the same and said pan in said closed position, and
stop means on said frame disposed to one side of said discharge opening, said stop means being engageable with said second dog means for locking said material discharge member in said open position.

6. The invention in accordance with claim 5,
said stop means comprising openings in said track members adapted to receive said second dog means.

References Cited

UNITED STATES PATENTS

| | | | |
|---|---|---|---|
| 2,751,862 | 6/1956 | Dorey | 105—282 |
| 2,888,170 | 5/1959 | McCloskey | 222—561 XR |
| 3,082,705 | 3/1963 | Dorey | 222—561 XR |
| 3,138,117 | 6/1964 | Dorey | 222—561 XR |
| 3,248,026 | 4/1966 | Kemp | 222—545 |
| 3,348,501 | 10/1967 | Stevens et al. | 105—248 |

ROBERT B. REEVES, Primary Examiner

U.S. Cl. X.R.
105—282; 222—561